(12) United States Patent
Yoo et al.

(10) Patent No.: US 9,137,906 B2
(45) Date of Patent: Sep. 15, 2015

(54) MOBILE TERMINAL

(71) Applicant: LG ELECTRONICS INC., Seoul (KR)

(72) Inventors: Joonhee Yoo, Seoul (KR); Hyunho Lee, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 178 days.

(21) Appl. No.: 13/682,368

(22) Filed: Nov. 20, 2012

(65) Prior Publication Data

US 2013/0242522 A1    Sep. 19, 2013

(30) Foreign Application Priority Data

Mar. 16, 2012 (KR) ........................ 10-2012-0027367

(51) Int. Cl.
| | |
|---|---|
| *H05K 5/00* | (2006.01) |
| *H05K 5/02* | (2006.01) |
| *G06F 1/16* | (2006.01) |
| *H04M 1/02* | (2006.01) |
| *H04M 1/23* | (2006.01) |

(52) U.S. Cl.
CPC ............ *H05K 5/0017* (2013.01); *G06F 1/1658* (2013.01); *H04M 1/0266* (2013.01); *H05K 5/02* (2013.01); *H04M 1/23* (2013.01)

(58) Field of Classification Search
CPC ..... H05K 5/02; H05K 5/0017; H05K 5/0213; A61F 13/42; H01R 13/5227; G08B 21/21
USPC .......................... 361/604, 680, 767, 687, 688
See application file for complete search history.

(56) References Cited

U.S. PATENT DOCUMENTS

| | | | | |
|---|---|---|---|---|
| 7,457,113 | B2 * | 11/2008 | Kumhyr et al. | .......... 361/679.48 |
| 7,826,001 | B2 * | 11/2010 | Tai et al. | .......................... 349/58 |
| 2008/0213679 | A1 * | 9/2008 | Miyakawa et al. | ................ 430/5 |
| 2010/0075720 | A1 * | 3/2010 | Lee et al. | ....................... 455/566 |

FOREIGN PATENT DOCUMENTS

JP    2005201268    *    4/2004    ............ G02F 1/1333

* cited by examiner

*Primary Examiner* — Tremesha S Willis
*Assistant Examiner* — Michael E Moats, Jr.
(74) *Attorney, Agent, or Firm* — Birch, Stewart, Kolasch & Birch, LLP

(57) ABSTRACT

A mobile terminal includes a display configured to output visual information, a window unit configured to cover the display, a frame configured to accommodate the display therein, and having a mounting portion for supporting the window unit, a through hole formed at the mounting portion, and a channel portion configured to communicate a space between the display and the window unit with the through hole.

9 Claims, 8 Drawing Sheets

MOBILE TERMINAL

CROSS-REFERENCE TO RELATED APPLICATION

Pursuant to 35 U.S.C. §119(a), this application claims the benefit of earlier filing date and right of priority to Korean Application No. 10-2012-0027367, filed on Mar. 16, 2012, the contents of which is incorporated by reference herein in its entirety.

BACKGROUND OF THE INVENTION

1. Field of the Invention

The present disclosure relates to a mobile terminal, and particularly, to a mobile terminal having a display unit.

2. Background of the Invention

A mobile terminal is a device that can be carried around and has one or more functions such as to perform voice and video call communications, inputting and outputting information, storing data, and the like.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software.

For instance, when at least one of a display and a window unit which covers the display is transformed, the display and the window unit which has come in contact with each other are not separated from each other. As a result, stains may occur. This occurs because air does not pass through a gap between the display and the window unit, and thus an inner pressure of the mobile terminal is equal to or larger than a transformation restoration force.

In order to prevent such phenomenon, a structural improvement capable of preventing the occurrence of stain or removing occurred stain may be considered.

SUMMARY OF THE INVENTION

Therefore, an aspect of the detailed description is to provide a mobile terminal having a structure capable of preventing the occurrence of stain due to transformation of a display, or capable of removing occurred stain.

To achieve these and other advantages and in accordance with the purpose of this specification, as embodied and broadly described herein, there is provided a mobile terminal, comprising: a display configured to output visual information; a window unit configured to cover the display; a frame configured to accommodate the display therein, and having a mounting portion for supporting the window unit; a through hole formed at the mounting portion; and a channel film disposed between the window unit and the mounting portion, and configured to communicate a space between the display and the window unit with the through hole.

According to an embodiment of the present invention, the channel film may form a channel connected to the through hole from the space between the display and the window unit, by contacting the window unit.

The channel film may include a base; a hole formed at the base in correspondence to the through hole; and a channel portion extending from one end of the base to the hole, and forming the channel by contacting the window unit. The channel portion may be formed as one surface of the base facing the window unit is recessed or protruded.

According to another embodiment of the present invention, the channel film may include a base; and an air duct which forms a channel connected to the through hole via the inside of the base.

According to another embodiment of the present invention, the channel film may be formed of a porous material. The mobile terminal may further comprise a push key accommodated in the through hole, and pressed in a state of being exposed to the outside through a window hole of the window unit.

According to another embodiment of the present invention, the window unit may be divided into a central region corresponding to the display, and an edge region which encloses the central region. And, the channel film may extend from a boundary between the central region and the edge region.

On a rear surface of the channel film, may be disposed an adhesive film corresponding to the edge region, configured to fix the channel film to the mounting portion, and configured to communicate the hole with the through hole.

According to another embodiment of the present invention, the through hole may be formed to be bent from one or more points thereof, such that foreign materials are prevented from being introduced to the space between the display and the window unit. The mobile terminal may further comprise an air duct bent from one or more points thereof, and implementing the through hole by being insert-molded into the frame.

According to another embodiment of the present invention, a ventilation pad formed of a porous material and configured to cover the through hole, may be attached to a rear surface of the mounting portion. The ventilation pad may be formed to pass air therethrough, and may be configured to prevent foreign materials from being introduced into the space between the display and the window unit.

According to another embodiment of the present invention, the window unit may include a transparent window; and a touch sensor disposed on a rear surface of the window, and configured to sense a touch input with respect to the window. And, the channel film may be configured to form a channel connected to the through hole from the space between the display and the window unit, by contacting the touch sensor.

According to another aspect of the present invention, there is provided a mobile terminal, comprising: a display configured to output visual information; a window unit configured to cover the display, and having a central region corresponding to the display and an edge region which encloses the central region; a frame configured to accommodate the display therein, and having a mounting portion for supporting the window unit; a through hole formed at the mounting portion; and a channel portion formed on a rear surface of the edge region, and configured to communicate a space between the display and the window unit with the through hole.

According to another embodiment of the present invention, the channel portion may contact the mounting portion by being protruded or recessed from a rear surface of the window unit, thereby forming a channel connected to the through hole from the space between the display and the window unit.

According to another embodiment of the present invention, the channel portion may extend towards the through hole, from a boundary between the central region and the edge region.

According to another embodiment of the present invention, the window unit may include a transparent window; and a touch sensor disposed on a rear surface of the window, and configured to sense a touch input with respect to the window.

And, the channel portion may be configured to form a channel connected to the through hole from the space between the display and the window unit, as a rear surface of the touch sensor undergoes a recessing process or an embossing process.

According to another embodiment of the present invention, the mobile terminal may further comprise a ventilation pad formed of a porous material, and attached to a rear surface of the mounting portion so as to cover the through hole.

According to still another aspect of the present invention, there is provided a mobile terminal, comprising: a display configured to output visual information; a window unit configured to cover the display; a frame configured to accommodate the display therein, and having a mounting portion for supporting the window unit; a through hole formed at the mounting portion; and a channel portion configured to communicate a space between the display and the window unit with the through hole.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present disclosure will be explained in more detail with reference to the attached drawings. The suffixes attached to components of the mobile terminal, such as 'module' and 'unit or portion' were used for facilitation of the detailed description of the present disclosure. Therefore, the suffixes do not have different meanings from each other.

The mobile terminal according to the present disclosure may include a portable phone, a smart phone, a laptop computer, a digital broadcasting terminal, Personal Digital Assistants (PDA), Portable Multimedia Player (PMP), an E-book, a navigation system, etc. However, it will be obvious to those skilled in the art that the present invention may be also applicable to a fixed terminal such as a digital TV and a desktop computer.

Figure 1:
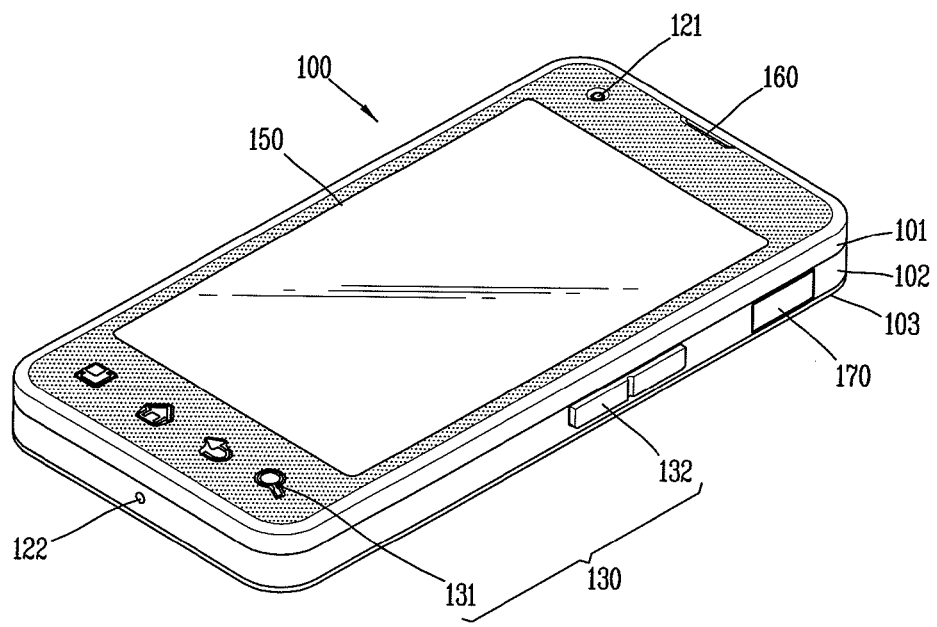
FIG. 1 is a front perspective view of a mobile terminal according to the present invention.

FIG. 1 is a front perspective view of a mobile terminal 100 according to the present disclosure.

The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a terminal body may include a front case 101 and a rear case 102. At least one intermediate case may be disposed between the front case 101 and the rear case 102. And, a battery cover 103 for covering a power supply unit 190 may be detachably mounted to the rear case 102.

Various components may be accommodated in a space formed by the front case 101 and the rear case 102. Such cases may be formed by injection-molded synthetic resin, or may be formed using a metallic material such as stainless steel (STS), titanium (Ti) and aluminum (Al).

A display unit 150, a first audio output unit 160, a first camera 121, a user input unit 130, etc. may be formed on the front surface of the terminal body. And, an audio input unit 122, an interface unit 170, etc. may be formed on the side surface of the terminal body.

The display unit 150 may display information processed in the mobile terminal 100. For example, when the mobile terminal 100 is in a phone call mode, the display unit 151 may display a User Interface (UI) or a Graphic User Interface (GUI) associated with a call When the mobile terminal 100 is in a video call mode or image capturing mode, the display unit 150 may display a captured image and/or received image, a UI or GUI that shows videos or images and functions related thereto, and the like.

The display unit 150 may include a touch sensor 152b (refer to FIG. 3) so as to be operated as a touch screen. Once a region on the display unit 150 is touched through the touch sensor 152b, content corresponding to the touched region is input. Content input in a touch manner may be texts, numbers, or menu items which can be instructed or set in each mode.

The touch sensor 152b may be formed to be transmissive so that the display unit 150 can be viewed, and may include a structure for enhancing visibility of the touch screen at a bright place. Referring to FIG. 1, the display unit 150 occupies most parts of the front surface of the front case 101.

A first audio output unit 160 and a first camera 121 are disposed at a region close to one end of the display unit 150, and a user input unit 131 and an audio input unit 122 are disposed at a region close to another end of the display unit 150. A user input unit 132, an interface unit 170, etc. may be disposed on the side surface of the terminal body.

The first audio output unit 160 may be implemented as a receiver for transmitting a call sound to a user's ears, or a loud speaker for outputting each type of alarm sounds or a play sound of multimedia.

The first camera 121 processes image data of still pictures or video acquired by an image capture device in a video capturing mode or an image capturing mode. The processed image frames may be displayed on the display unit 150.

The user input unit 130 is manipulated to receive a command for controlling the operation of the mobile terminal 100, and may include a plurality of manipulation units 131 and 132. The manipulation units 131 and 132 may be referred to as manipulating portions, and may include any type of ones that can be manipulated in a user's tactile manner.

The first and second manipulation units 131 and 132 may be set to receive inputs in various manners. For instance, the first manipulation unit 131 may be configured to input commands such as START, END, and SCROLL, and the second manipulation unit 132 may be configured to input commands such as controlling a volume of a sound outputted from the first audio output unit 160, or converting a mode of the display unit 150 into a touch recognition mode.

The interface unit 170 may be generally implemented to interface the mobile terminal 100 with external devices. For example, the interface unit 170 may include at least one of a connection terminal for wired or wireless connection with an earphone, a port for short-range communication (e.g., Infrared ray port (IrDA Port), Bluetooth port, wireless LAN port, etc.), and a power supply terminal for supplying power to the mobile terminal 100. Such interface unit 170 may be implemented as a socket for accommodating therein an external card such as a Subscriber Identity Module (SIM), a User Identity Module (UIM), and a memory card for information storage.

Figure 2:
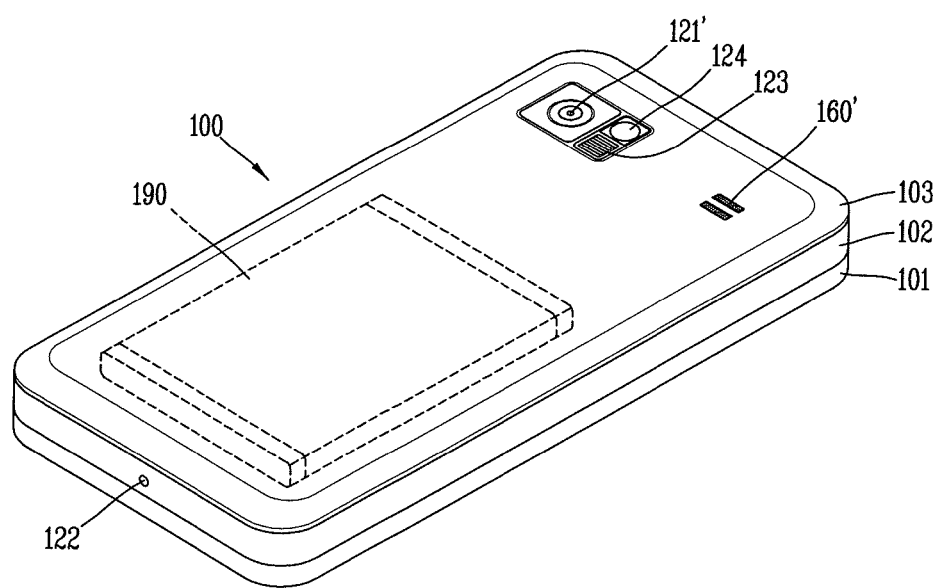
FIG. 2 is a rear perspective view of the mobile terminal of FIG. 1.

FIG. 2 is a rear perspective view of the mobile terminal 100 of FIG. 1.

Referring to FIG. 2, a second camera 121' may be additionally mounted to the rear surface of the terminal body. The second camera 121' faces a direction which is opposite to a direction faced by the first camera 121 (refer to FIG. 1), and may have pixels different from those of the first camera 121.

For example, the first camera 121 may operate with relatively lower pixels (lower resolution). Thus, the first camera 121 may be useful when a user can capture his or her face and send it to a calling party in a video call mode or the like. On the other hand, the second camera 121' may operate with a relatively higher pixels (higher resolution) such that it can be useful for a user to obtain higher quality pictures for later use. The first and second cameras 121 and 121' may be installed at the terminal body so as to be rotated or popped-up.

A flash 123 and a mirror 124 may be additionally disposed close to the second camera 121'. When capturing an object by using the second camera 121', the flash 123 provides light to the object. The mirror 124 can cooperate with the second camera 121' to allow a user to photograph himself or herself in a self-portrait mode.

A second audio output unit 160' may be additionally disposed on the rear surface of the terminal body. The second audio output module 160' may implement a stereo function together with the first audio output module 160 (refer to FIG. 1), and may be used for calling in a speaker phone mode.

A broadcast signal receiving antenna (not shown), as well as an antenna for calling may be additionally disposed on the side surface of the terminal body. An antenna, part of a broadcast receiving module may be installed to be retractable into the terminal body.

The power supply unit 190 for supplying power to the mobile terminal 100 is mounted to the terminal body. The power supply unit 190 may be implemented as a battery for converting chemical energy into electric energy. And, the battery may be mounted in the terminal body, or may be detachably mounted to the terminal body.

Figure 3:
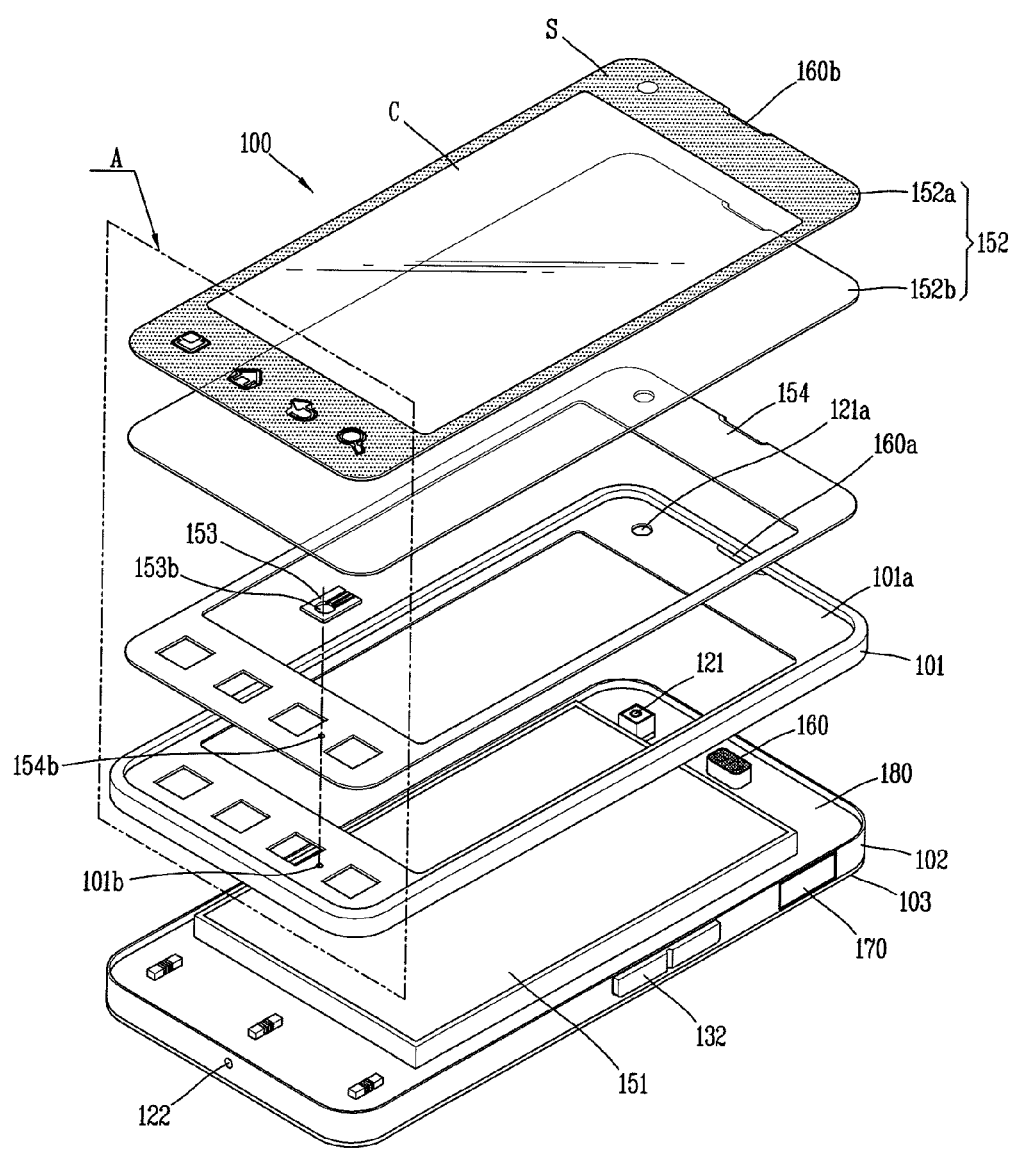
FIG. 3 is a disassembled perspective view of the mobile terminal of FIG. 1.

FIG. 3 is a disassembled perspective view of the mobile terminal 100 of FIG. 1.

Referring to FIG. 3, a circuit board 180 is disposed in the terminal body. As shown, the circuit board 180 may be mounted to the rear case 102, or may be installed at an additional inner structure. The circuit board 180 may be configured as an example of the controller for executing each type of functions of the mobile terminal 100. As shown, the first audio output unit 160, the first camera 121, etc. may be mounted to the circuit board 180.

The display 150 for displaying information processed by the mobile terminal 100 is disposed on one surface of the terminal body. The display 150 may be disposed to occupy most of a front surface of the terminal body. The display unit 150 includes a display 151 and a window 152 which covers the display 151.

The mobile terminal 100 is provided with a frame for accommodating the display 151 therein. In this embodiment, the frame is implemented as the front case 101 which forms the appearance of the terminal body. However, the frame may be implemented as an additional inner structure different from the front case 101.

A mounting portion 101*a* may be formed at the front case 101. The mounting portion 101*a* is recessed from one surface of the front case 101, thereby forming space where the window unit 152 is mounted. A hole 121*a* corresponding to the first camera 121, and a sound hole 160*a* corresponding to the first audio output unit 160 are formed at the mounting portion 101*a*. The sound hole 160*a* may be disposed close to a side wall of the front case 101.

The window unit 152 is mounted to the mounting portion 101*a*. A light-transmissive region of the window unit 152 may have an area corresponding to the display 151. Accordingly, a user can recognize visual information output from the display 151, from the outside.

A recess 160*b* may be formed on a side surface of the window unit 152, the side surface facing a side wall of the front case 101 and forming an assembly gap. Under this structure, sound generated from the first audio output unit 160 is emitted via the assembly gap between the front case 101 and the window unit 152. Accordingly, the mobile terminal requires no additional hole for outputting audio, thereby having a more simple appearance.

The display 151 is disposed on a rear surface of the window unit 152, and is accommodated in the front case 101, thereby constituting the display unit 150 together with the window unit 152. The display 151 is electrically connected to the circuit board 180, and outputs visual information under control of the controller. The display 151 may have an area corresponding to a light-transmissive region of the window unit 152.

The display 151 may include at least one of a Liquid Crystal Display (LCD), a Thin Film Transistor-LCD (TFT-LCD), an Organic Light Emitting Diode (OLED) display, a flexible display, and a three-dimensional (3D) display.

As shown, the window unit 152 may include a transparent window 152*a*, and a touch sensor 152*b* disposed on one surface of the window 152*a*, and configured to sense a touch input with respect to the window 152*a*.

The window 152*a* may be formed of a transmissive material, e.g., transmissive synthetic resin, reinforcing glass, etc. The window 152*a* may include a non-transmissive region.

The window 152*a* includes an edge region (S) which undergoes an opaque processing, and a central region (C) enclosed by the edge region (S). The edge region (S) may be mounted to the mounting portion 101a for support, and the central region (C) may have an area corresponding to the display 151.

The touch sensor 152b is configured to convert a change of a voltage or a charge amount on a specific part of the window 152a, into an electric input signal. The touch sensor 152b is formed to be light-transmissive such that an image formed on the display 151 can be viewed. An area of the touch sensor 152b corresponding to part of the window 152a where light passes through, forms an input area.

The touch sensor 152b may be provided with a conductive pattern implemented as a conductive material is patterned in a deposition manner, or in a printing manner, on the window 152a or an additional film. As the conductive material, may be used indium tin oxide (ITO), carbon nano tube (CNT), conductive polymer, $In_2O_3$, $SnO_2$, Au, etc.

The touch sensor 152b implemented in the form of a film, may be attached to the rear surface of the window 152a. An adhesive layer may be disposed between the window 152a and the touch sensor 152b so as to perform coupling therebetween. As the adhesive layer, may be used an optical clear adhesive (OCA), a super view resin (SVR), etc.

The window unit 152 may be firmly fixed to the mounting portion 101a through an adhesive film 154. The adhesive film 154 is configured to seal a space between the display 151 and the window unit 152, such that foreign materials cannot be introduced into the space therebetween. And, the adhesive film 154 may be formed in a loop shape corresponding to the mounting portion 101a.

The display 151 and the window unit 152 may constitute the display unit 150, and may be modularized as a single assembly. If the window unit 152 includes the touch sensor 152b, the display unit 150 operates as a touch screen.

As aforementioned in the background of the invention, the display 151 and the window unit 152 which covers the display 151 may come in contact with each other due to transformation of at least one of them, which may cause stains. This results from that air does not pass through the space between the display 151 and the window unit 152, and thus inner pressure of the space is maintained to be equal to or larger than a transformation restoration force.

Hereinafter, will be explained a structure for preventing the occurrence of stains, or removing stains occurring due to transformation of the display unit 150.

Figure 4:
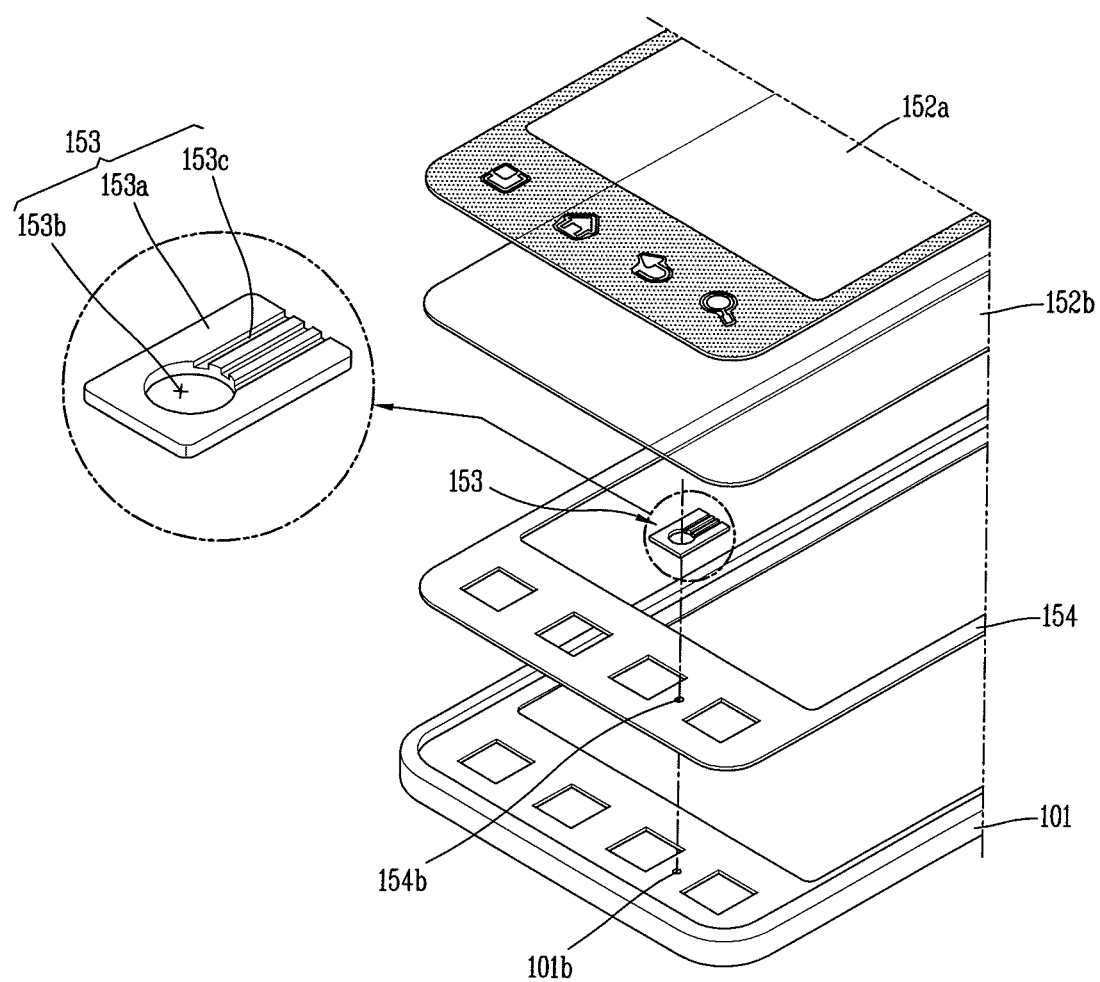
FIG. 4 is an enlarged view of part 'A' of FIG. 3.
Figure 5:
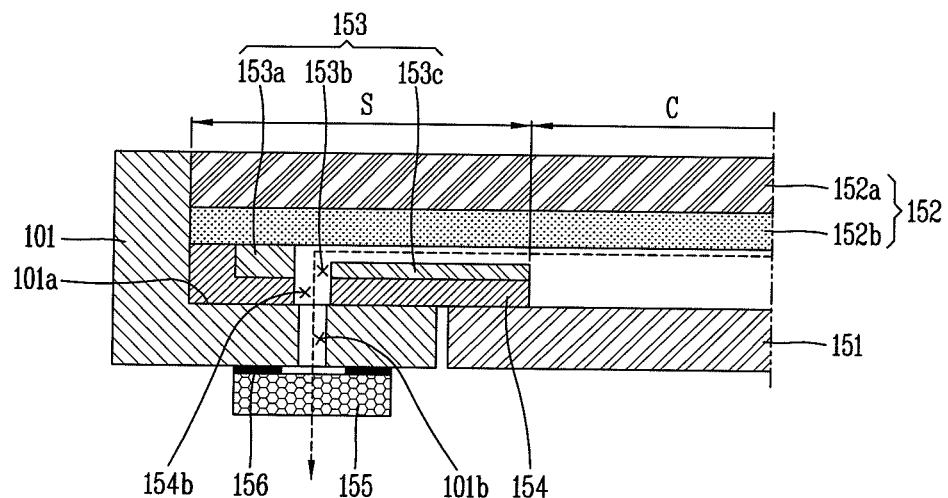
FIG. 5 is a sectional view of part 'A' of FIG. 3.

FIG. 4 is an enlarged view of part 'A' of FIG. 3, and FIG. 5 is a sectional view of part 'A' of FIG. 3.

Referring to FIGS. 4 and 5 with FIG. 3, a through hole 101b is formed at the mounting portion 101a. In the drawings, the through hole 101b is formed at a lower end of the terminal body close to the first manipulating unit 131. However, the present invention is not limited to this. The through hole 101b may be formed in plurality in number.

The through hole 101b may be communicated with an assembly space inside the terminal body, or may be communicated with the outside through an assembly gap. For instance, the through hole 101b may be communicated with an audio input unit 122.

A channel film 153 is disposed between the window unit 152 and the mounting portion 101a. The channel film 153 is configured to communicate a space between the display 151 and the window unit 152 with the through hole 101b. As a result, air passes through the space thus to allow transformation of the display unit 150 to be restored. This may remove stains occurring due to the transformation.

The channel film 153 comes in contact with the window 152a, thereby forming a channel which is connected to the through hole 101b from the space between the display 151 and the window unit 152. The channel may serve as a flow path along which air flows.

The channel film 153 may be implemented as a thin sheet, and may have a thickness thin enough to prevent the window unit 152 from having a gap from the mounting portion 101a for sealing. The channel film 153 includes a base 153a, a hole 153b and a channel portion 153c.

The base 153a may extend towards the through hole 101b, from a boundary between the central region (C) and the edge region (S). The base 153a may be formed of synthetic resin, such as polyethylene terephthalate (PET), polypropylene (PP) and polyethylene (PE). The base 153a may be formed to be transparent so as not to be exposed to the outside. Alternatively, the base 153a may be formed to have the same color as the edge region (S).

A hole 153b is formed at the base 153a in correspondence to the through hole 101b. The hole 153b may be formed close to one end of the base 153a in an extending direction. Preferably, the hole 153b is larger than the through hole 101b, such that the hole 153b can enclose the through hole 101b when the channel film 153 is disposed on the mounting portion 101a.

The channel portion 153c extends, towards the hole 153b, from another end of the base 153a (boundary between the central region (C) and the edge region (S)), and contacts the window 152 thus to form the channel. The channel portion 153c may be formed such that its side facing the window 152a of the base 153a is recessed (concaved). The channel portion 153c may be formed in plurality so that transformation of the display unit 150 can be rapidly restored.

The window unit 152 may be firmly fixed to the mounting portion 101a through an adhesive film 154, and the channel film 153 may be attached onto the adhesive film 154. The adhesive film 154 may be formed in a loop shape corresponding to the edge region (S).

The adhesive film 154 is configured to communicate the hole 153b and the through hole 101b with each other. For instance, the adhesive film 154 may be provided with a hole 154b corresponding to the hole 153b and the through hole 101b. The channel film 153 having the channel portion 153c is attached onto the adhesive film 154. Then, the adhesive film 154 is punched in correspondence to the through hole 101b, thereby forming holes 153b and 154b of the same size at a time.

The adhesive film 154 may be formed of a porous material which allows air to pass therethrough.

A ventilation pad 155 formed of a porous material, may be formed on the rear surface of the mounting portion 101a, so as to cover the through hole 101b. The ventilation pad 155 configured to pass air therethrough may be formed to prevent foreign materials from being introduced into the space between the display 151 and the window unit 152. The ventilation pad 155 may be implemented as a sponge.

An adhesion layer 156 may be formed on one surface of the ventilation pad 155, so that the ventilation pad 155 can be attached to the rear surface of the mounting portion 101a. Here, the adhesion layer 156 may be formed to enclose the through hole 101b in a ring shape, so that air can pass therethrough.

Hereinafter, will be explained other structures for communicating the space between the display 151 and the window unit 152 to other spaces. The same or similar configurations as/to those aforementioned in the previous embodiment, will be provided with the same or similar reference numbers, and explanations thereof will be omitted.

Figure 6:
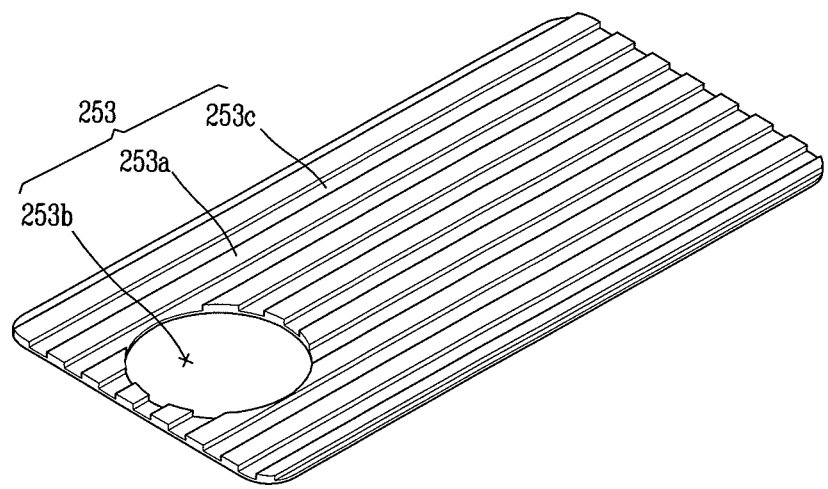
FIGS. 6 and 7 are conceptual views showing modification examples of a channel film of FIG. 3.
Figure 7:
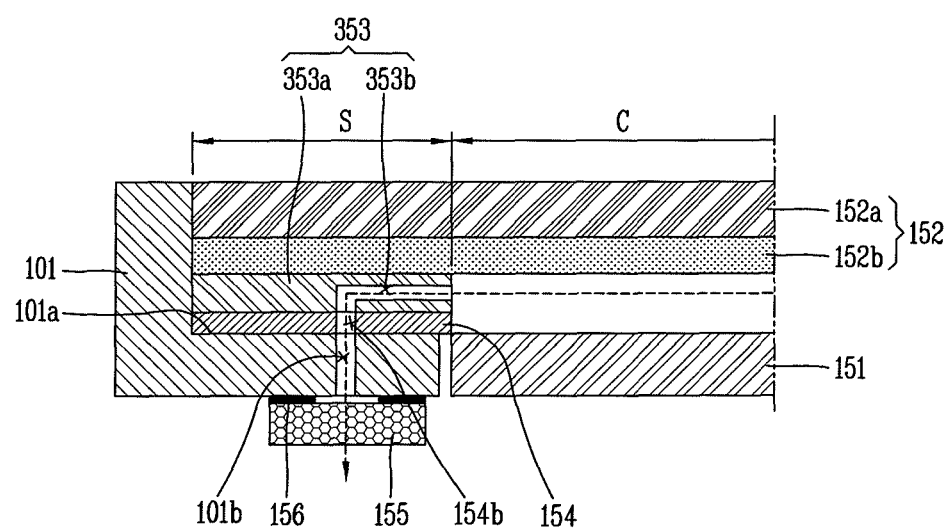

FIGS. 6 and 7 are conceptual views showing modification examples of the channel film 153 of FIG. 3.

Referring to FIG. 6, a channel film 253 has a similar structure to the aforementioned channel film 153. More specifically, the channel film 253 is the same as the aforementioned channel film 153 in that the space between the display 151 and the window unit 152 is communicated with the through hole 101b through a base 253a, a hole 253b and a channel portion 253c. However, the channel film 253 is different from the channel film 153 in that a side of the channel portion 253c which faces the window 152a of the base 253a is formed to be convex (protruded).

Such structure is advantageous in that an additional recessing process is not required when fabricating the material of the channel film 253, i.e., the base 253a in a concavo-convex manner.

Referring to FIG. 7, a channel film 353 may include a base 353a and an air duct 353b. The air duct 353b implements a channel connected to the through hole 101b via the inside of the base 353a. Under such structure, the air duct 353b replaces the functions of the channel portion 153c and the hole 153b, the channel portion 153c for communicating the space between the display 151 and the window unit 152 with the through hole 101b. Accordingly, the structure of the channel film 353 can be more simplified.

Figure 8:
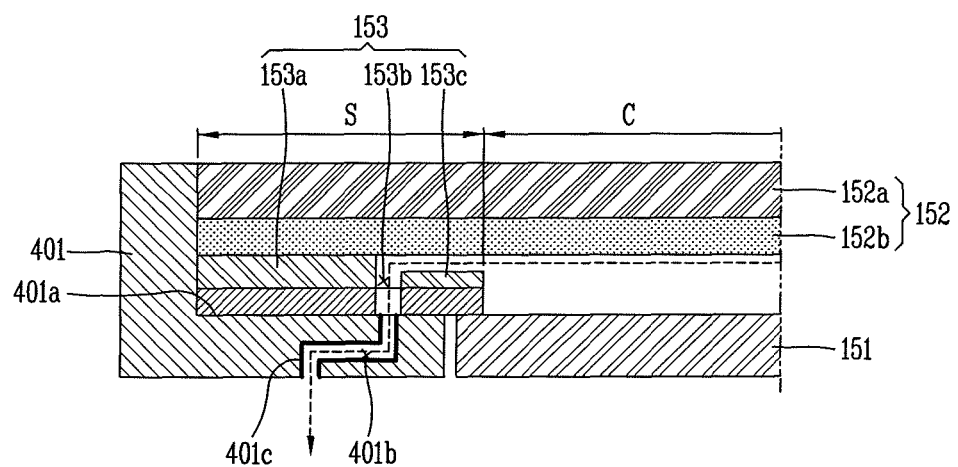
FIGS. 8 and 9 are conceptual views showing modification examples of a through hole of FIG. 4.
Figure 9:
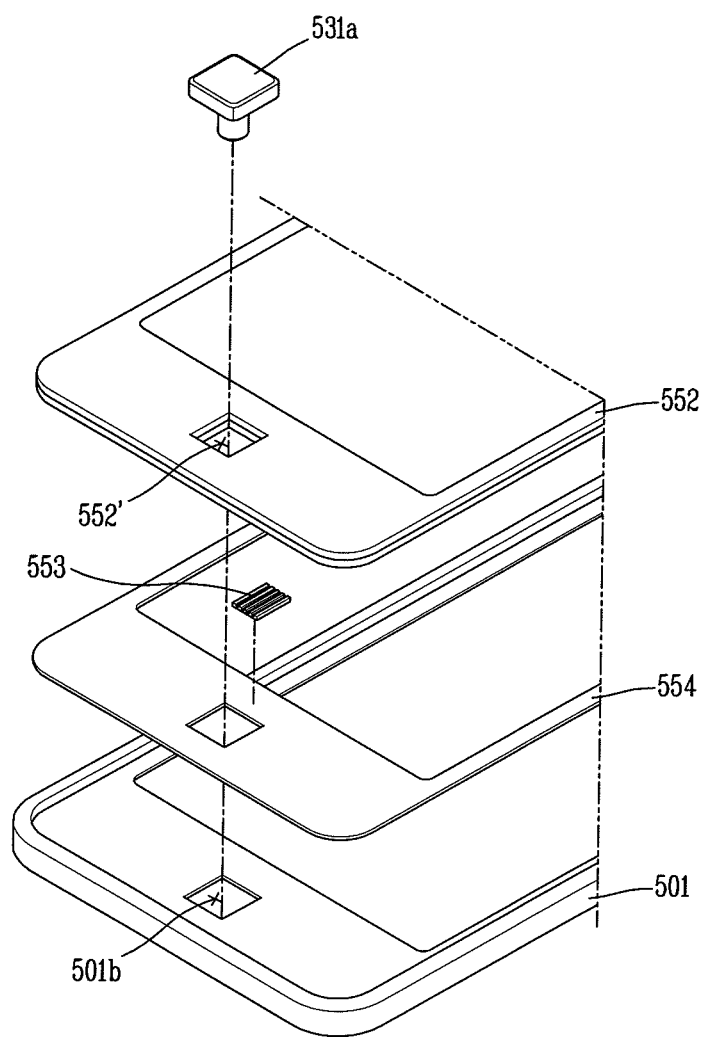

FIGS. 8 and 9 are conceptual views showing modification examples of the through hole 101b of FIG. 4.

Referring to FIG. 8, a through hole 401b may be formed to be bent at one or more points thereof, such that foreign materials can be prevented from being introduced into the space between the display 151 and the window unit 152. Under such structure, air can smoothly pass through the through hole 401b, whereas foreign materials cannot easily pass through the through hole 401b due to its complicated inner structure. Accordingly, the ventilation pad 155 disposed to cover the through hole 101b in the aforementioned embodiment, is not required to lower the material costs.

The through hole 401b may be formed as an air duct 401c bent at one or more points is insert-molded to a frame, i.e., a front case 401. Alternatively, the through hole 401b may be implemented as an assembly gap formed when a plurality of members of a frame are coupled to each other.

Referring to FIG. 9, a through hole 501b is formed in a size larger than that of the through hole 101b aforementioned in the previous embodiment, so as to accommodate therein a push key 531a. The push key 531a is exposed to the outside through a window hole 552' of a window unit 552, and operates in a pressed manner. The push key 531a may be implemented as part of a first manipulating unit 531.

A channel film 553 is disposed between the window unit 552 and a mounting portion 501a, and is configured to communicate a space between a display 551 and the window unit 552 with the through hole 501b or the window hole 552'. The channel film 553 is formed of a porous material so that air can pass therethrough. And, the channel film 553 is configured to prevent foreign materials from being introduced into the space between the display 551 and the window unit 552 through the window hole 552' or the through hole 501b.

Under such structure, the through hole 501b having the push key 531a inserted thereinto operates as an air hole (air vent). This can allow a more simplified structure.

Figure 10:
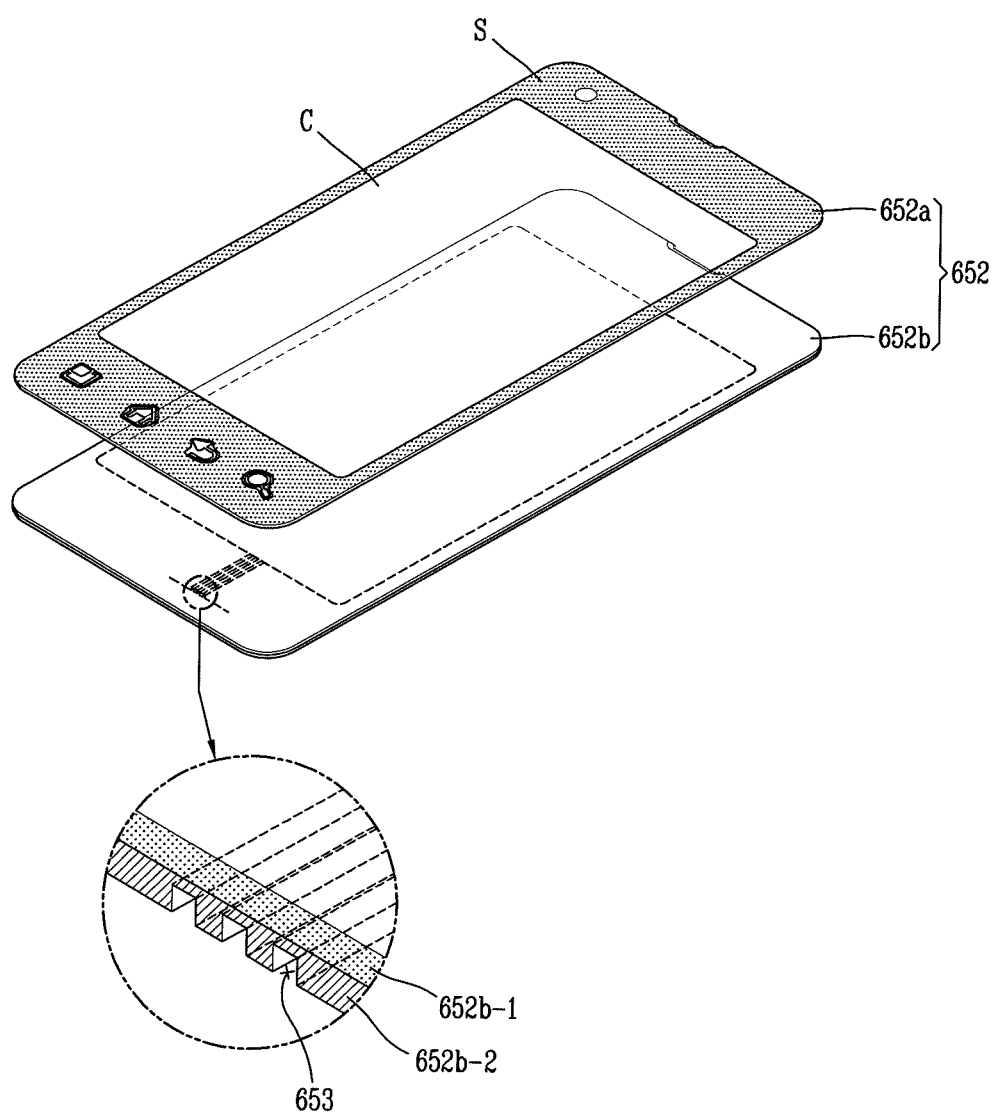
FIG. 10 is a disassembled perspective view showing another example of a window unit according to the present invention.
Figure 11:
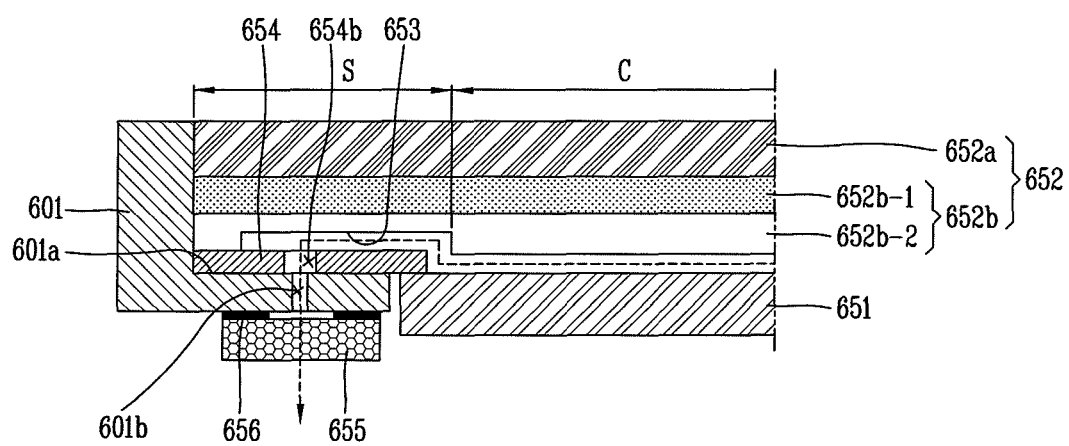
FIG. 11 is a sectional view of the window unit of FIG. 10.

FIG. 10 is a disassembled perspective view showing another example of the window unit according to the present invention, and FIG. 11 is a sectional view of a window unit 652 of FIG. 10.

Referring to FIGS. 10 and 11, the window unit 652 includes a central region (C) corresponding to a display 651, and an edge region (S) which encloses the central region (C). A channel portion 653 is formed on the rear surface of the edge region (S), which communicates a space between the display 651 and the window unit 652 with a through hole 601b.

The channel portion 653 is protruded or recessed from the rear surface of the window unit 652 thus to come in contact with a mounting portion 601a, thereby forming a channel connected to the through hole 601b from the space between the display 651 and the window unit 652. The channel portion 653 extends towards the through hole 601b, from a boundary between the central region (C) and the edge region (S).

As an example, the window unit 652 may include a light-transmissive window 652a, and a touch sensor 652b formed on the rear surface of the window 652a and sensing a touch input with respect to the window 652a. The channel portion 653 may be recessed or protruded from the rear surface of the touch sensor 652b, thereby forming a channel connected to the through hole 601b from the space between the display 651 and the window unit 652. The channel portion 653 may be also formed on the rear surface of the window 652a.

The touch sensor 652b may include a first touch sensor 652b-1 and a second touch sensor 652b-2 disposed in a layered manner. The first touch sensor 652b-1 is provided with a first conductive pattern which extends in a first direction so as to sense a touch input in a first direction. The second touch sensor 652b-2 is disposed to be covered with the first touch sensor 153a. The second touch sensor 652b-2 is provided with a second conductive pattern which extends in a second direction so as to sense a touch input in a second direction.

In drawings, the channel portion 653 is formed by performing a recessing process with respect to the rear surface of the second touch sensor 652b-2, through etching, scratching, etc. However, the channel portion 653 may be formed by performing an embossing process with respect to the rear surface of the second touch sensor 652b-2, through deposition, printing, etc. For instance, the channel portion 653 may be implemented as a routing electrode electrically connected to a second conductive pattern and transmitting a signal to a circuit board 680. Here, the second conductive pattern is patterned on the second touch sensor 652b-2, and is configured to sense a touch input. Alternatively, the channel portion 653 may be implemented as a dummy electrode not electrically connected to the second conductive pattern.

Under such structure, the channel portion 653 for communicating the space between the display 651 and the window unit 652 with the through hole 601b, is formed at the window unit 652. Accordingly, an additional member having such function to communicate the space between the display 651 and the window unit 652 with the through hole 601b, is not required.

The present invention has the following advantages.

Firstly, the through hole is formed at the mounting portion, and the channel portion is configured to communicate the space between the display and the window unit with the through hole. This can allow air to pass through the space thus to restore transformation of the display unit. As a result, stains occurring due to the transformation can be removed.

Secondly, a gap between the display and the window unit can be more reduced than in the conventional art where the display and the window unit are spaced from each other with consideration of a transformation degree. As a result, the mobile terminal can have a slimmer configuration.

Thirdly, the display or the window unit needs not undergo a surface processing for preventing the occurrence of stains. This can prevent lowering of visibility, and can reduce the material costs.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a display configured to output visual information;
    a window unit configured to cover the display, the window unit being separated from the display to define a space;
    a frame configured to accommodate the display therein, the frame having a mounting portion to support the window unit;
    a through hole formed in the mounting portion facing a rear surface of the window unit; and
    a channel film disposed between the window unit and the mounting portion, the channel film being configured to provide a channel extending between the through hole and said space by contacting the window unit,
    wherein the channel film includes:
        a base;
        a hole formed in the base corresponding to the through hole; and
        a channel portion extending from one end of the base to the hole, the channel being formed in the channel portion.

2. The mobile terminal of claim 1, wherein the channel portion is formed to be either recessed at or protruded from a surface of the base facing the window unit.

3. The mobile terminal of claim 1, wherein the window unit is divided into a central region corresponding to the display and an edge region which encloses the central region, and
    wherein the channel film extends from a boundary between the central region and the edge region to the through hole.

4. The mobile terminal of claim 3, further comprising an adhesive film corresponding to the edge region configured to fix the channel film to the mounting portion, the adhesive film having a hole corresponding to the through hole of the mounting portion and the hole of the channel film, and the adhesive film being formed on a rear surface of the channel film.

5. The mobile terminal of claim 1, wherein the through hole is provide with at least one bent portion such that foreign materials are prevented from being introduced to said space.

6. The mobile terminal of claim 5, wherein the through hole is an air duct bent at least one point thereof, the air duct being insert-molded into the frame.

7. The mobile terminal of claim 1, further comprising a ventilation pad formed of a porous material and configured to cover the through hole attached to a rear surface of the mounting portion.

8. The mobile terminal of claim 7, wherein the ventilation pad is formed to pass air therethrough and is configured to prevent foreign materials from being introduced into said space.

9. The mobile terminal of claim 1, wherein the window unit includes:
    a transparent window; and
    a touch sensor disposed on a rear surface of the window, the touch sensor being configured to sense a touch input with respect to the transparent window, and
    wherein the channel film contacts the touch sensor.

* * * * *